United States Patent [19]
Kurata et al.

[11] Patent Number: 5,902,017
[45] Date of Patent: *May 11, 1999

[54] SEGMENT MOUNTED ON VEHICLE WHEEL OR ENDLESS RUBBER TRACK

[75] Inventors: Tomoyuki Kurata; Youichi Kumano; Kazuya Takahashi, all of Yokohama, Japan

[73] Assignee: Bridgestone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/758,449

[22] Filed: Nov. 29, 1996

[30] Foreign Application Priority Data

Dec. 3, 1995 [JP] Japan .................................... 7-337848
Feb. 9, 1996 [JP] Japan .................................... 8-048045

[51] Int. Cl.$^6$ ........................................................ B60C 7/08
[52] U.S. Cl. ........................... 301/43; 301/44.2; 305/191; 305/46
[58] Field of Search ........................... 301/43, 44.1, 44.2, 301/44.3; 305/46, 51, 187, 191, 192; 152/5, 7, 300, 305, 306, 308

[56] References Cited

U.S. PATENT DOCUMENTS

| | | | |
|---|---|---|---|
| 459,015 | 9/1891 | Myers ...................................... | 152/272 |
| 567,521 | 9/1896 | Tibbitt ................................. | 152/308 X |
| 1,372,116 | 3/1921 | Besser ................................. | 152/305 X |
| 1,421,029 | 6/1922 | Roe . | |
| 1,455,844 | 5/1923 | Lang ......................................... | 152/306 |
| 5,050,656 | 9/1991 | Ho ............................................. | 152/5 X |
| 5,685,616 | 11/1997 | Burns ................................... | 305/191 X |

FOREIGN PATENT DOCUMENTS

| | | | |
|---|---|---|---|
| 534192 | 1/1922 | France .................................... | 152/306 |
| 699615 | 2/1931 | France .................................... | 152/306 |
| 881944 | 5/1943 | France . | |
| 818523 | 8/1959 | United Kingdom . | |
| 857439 | 12/1960 | United Kingdom . | |
| WO 85 00566 | 2/1985 | WIPO . | |
| WO87/02953 | 5/1987 | WIPO . | |
| WO88/05729 | 8/1988 | WIPO . | |
| WO89/05736 | 6/1989 | WIPO . | |
| WO90/00983 | 2/1990 | WIPO . | |
| WO91/17899 | 11/1991 | WIPO . | |
| WO 95 05947 | 3/1995 | WIPO . | |

*Primary Examiner*—Russell D. Stormer
*Attorney, Agent, or Firm*—Oliff & Berridge, PLC

[57] ABSTRACT

A segment structure mounted on a wheel or an endless rubber track for increasing the driving force of off-road vehicles, civil engineering machines or construction machines is disclosed. A segment of a rubber elastic material mounted on the outer periphery of the wheels or the endless rubber track includes a bottom section adapted to be in contact with the wheel or the endless rubber track, a hollow section formed in the segment along the width of the wheel or the endless rubber track, and a stopper erected into the hollow section from the bottom section. The inner surface of the hollow section and the stopper are kept out of contact with each other under a static load.

17 Claims, 19 Drawing Sheets

SEGMENT MOUNTED ON VEHICLE WHEEL OR ENDLESS RUBBER TRACK

BACKGROUND OF THE INVENTION

1. Field of the Invention

The present invention relates to a segment structure of a rubber elastic material mounted on a wheel or an endless rubber track of civil engineering machines, construction machines such as a power shovel or vehicles used off-road for adding a driving power.

2. Description of the Related Art

A wheel structure is well known in which hollow segments of a rubber elastic material are continuously mounted with bolts and nuts or the like on a rim constituting the base of the vehicle wheel. In a wheel disclosed in JP-A No. 4-500485, for example, each segment has a hollow section formed along the width of the wheel, side sections defining the hollow section support each other, and the working vibrations are relaxed by the deformation of the side sections.

However, the supporting force derived from the contact between the side sections of the segments mounted on the wheel is comparatively small. When a large load is to be supported during the operation, therefore, the side sections are unavoidably deformed (distorted) considerably leading to a low stability. Also, since the sides of the segments are always in contact with each other, the friction heat is generated as the segment sides rub each other when the vehicle is driven at high speed, for example. This results in melting the segments or generating a smoke, thereby leading to the disadvantage of a shorter segment life. Our running test conducted at 50 km/h shows that smoke is generated and the segments sides are melted in as short a time as 9 minutes.

SUMMARY OF THE INVENTION

In view of the above-mentioned disadvantages of the prior art, a first object of the present invention is to provide a segment mounted on a wheel or an endless rubber track suitable as a driven part of a machine capable of running on an expressway.

A second object of the invention is to provide a segment mounted on a vehicle wheel or an endless rubber track in which an operator receives no rough feeling at the time of contact between the internal surface of a hollow section and a stopper and a protective measure is taken against the pitching generated during such work as excavation.

In order to achieve the above-mentioned objects, according to the present invention, there is provided a segment of a rubber elastic material mounted on the outer periphery of a vehicle wheel or an endless rubber track, comprising a bottom section mounted in contact on said wheel or said endless rubber track; side sections; an outer section formed on the ground-contact side; a hollow section defined by said bottom section, said side sections and said outer section and passing through said elastic segment; and a stopper formed in said hollow section in such a manner as to extend along the direction in which said hollow section passes through.

In a segment mounted on the vehicle wheel or the endless rubber track according to the invention, a stopper is formed to extend along the direction in which the hollow section passes through. To begin with, once the hollow section is formed, the vertical spring properties are relaxed for an improved riding comfort while the vehicle is running at high speed. Especially, the shock is relaxed when riding over a protrusion on the road. Further, since the stopper is formed in the hollow section in accordance with the present invention, the stopper comes into contact with the inner surface of the hollow section of the segment depending on the burden imposed during the work conducted while the machine is stationary. Thus, the spring constant is improved and the distortion of the segment is reduced as the inner surface of the hollow section of the segment comes into contact with the stopper depending on the way in which the load is imposed while the vehicle is stationary state. As this contact state is sustained, the rubbing between the stopper and the sides or outer surface of the hollow section causes a loss which produces the attenuation effect. As a result, the vibration such as pitching of the machine in response to a large load input during the excavation work, for example, can be accommodated in a short time.

The segment according to the invention is formed of a rubber elastic material, and the stopper in the hollow section is desirably formed of a substance of the same quality.

In this case, the inner surfaces of the side sections and the outer surface section (i.e. the ground-contact section) making up the hollow section of the segment are preferably not in contact with the stopper formed in the hollow section under a static load. These sections, however, may be in a contact to such a degree as not to generate heat or smoke while they are in service.

The term "static load" as used herein means such a load as applied to the segment only by the weight of the machine in stationary state and excludes complicated loads imposed during such work as excavation.

Preferably, a rigid plate is embedded in the bottom section, and at least a bolt is welded to the plate and protruded from inside the segment for use at the time of mounting the segment on the wheel or the endless rubber track.

Preferably, a supporter is embedded in the stopper to provide the function of preventing the displacement of a predetermined magnitude or more. This supporter is preferably erected from the plate which may be embedded in the bottom section.

In the presence of the supporter, the stopper in the hollow section may be formed by exposing the supporter in whole or in part.

The supporter improves the spring constant of the stopper and reduces the segment distortion when the inner surface of the hollow section and the stopper come into contact with each other.

Preferably, the side sections of the segment of a rubber elastic material have a surface curved toward the stopper. In the case where the side sections of the segment of a rubber elastic material have a surface curved toward the stopper in this way, a displacement in a predetermined direction can be predicted so that the desired deflection can be obtained. Further, although the stopper and the inner surface of the hollow section never come into contact with each other under a static load or while the vehicle is running at high speed, the stopper and the inner surface of the hollow section always rub against each other when they contact each other during such work as excavation. The resulting attenuation due to this rubbing has the advantage of accommodating the vibrations such as pitching of the machine in a short time.

According to this invention, the hollow section may be formed to extend along the width or along the peripheral direction of the wheel or the endless rubber track.

In the case where the hollow section is formed to extend along the width of the wheel or the endless rubber track, the side sections of adjacent segments of a rubber elastic material are preferably out of contact with each other when they are mounted on the wheel or the endless rubber track. The structure in which the side sections of adjacent segments of a rubber elastic material are out of contact with each other eliminates the rubbing between the side sections while the vehicle is driven at high speed, thereby preventing the rubber from being melted or generating smoke.

Also, in the case where the hollow section extends along the width of the wheel or the endless rubber track, particularly in order to achieve the above-described second object, the distance between the top surface of the stopper and the inner surface of the hollow section of the segment is desirably larger at the forward and rear ends and smaller at the central portion in the direction in which the vehicle is driven.

More preferably, the inner wall and/or the outer wall of the side sections of the segment of the rubber elastic material preferably has a surface curved toward the stopper, and also a contact protrusion which face-contacts with the stopper when the elastic rubber segment is curved is preferably formed on the inner wall of the hollow section.

In the case where the top surface of the stopper and the inner surface of the hollow section in opposed relation to each other are formed in a specified shape as described above, the timing of contact between the top surface of the stopper and the inner surface of the hollow section can be retarded in steps. As a result, the inflection point of a deflection-load curve is blurred, thereby leading to the advantage that the rough feeling in vertical direction is eliminated as compared with when the top surface of the stopper and the inner surface of the hollow section wholly contact each other at the same time. This indicates that the riding comfort is improved even when the top surface of the stopper and the inner surface of the hollow section come into contact with each other while the vehicle is running at high speed.

In the case where the cross-sectional configuration of the top portion of the stopper is mountain-shaped or trapezoidal, in particular, the ends thereof are brought into contact with the inner surface of the hollow section later than the central portion thereof is. Consequently, a longer distance is allowed for rubbing between the stopper and the contact protrusion formed on the inner surface of the hollow section.

This means after all that the loss factor can be increased, thereby making it possible to attenuate the pitching during the excavation work. Further, in the case where the top surface of the stopper and the inner surface of the hollow section are in contact with each other over the whole surfaces thereof at the same time, they would fail to rub but only deform, and no loss is generated. According to the invention, by contrast, the contact protrusion and the outer peripheral surface of the stopper rub against each other, thereby producing a loss effectively.

The outer surface of the segment can of course be formed with a predetermined lug.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

The present invention will be described in more detail below with reference to embodiments.

Figure 1:
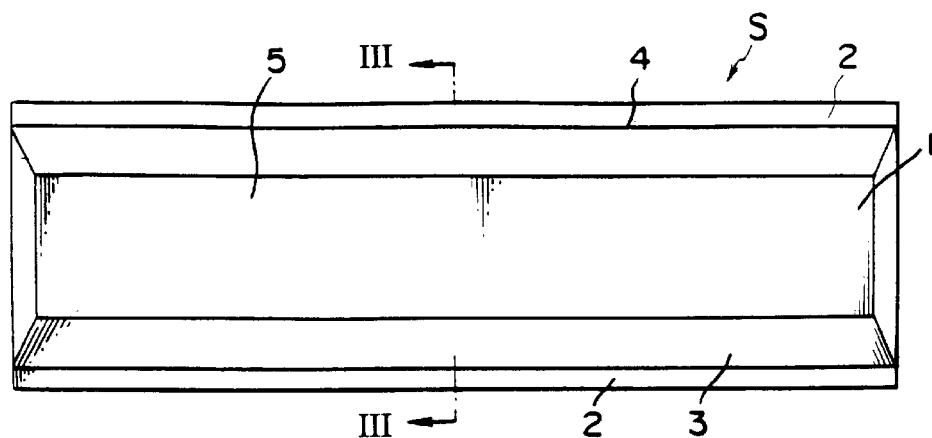
FIG. 1 is a plan view showing the outer peripheral surface of a segment according to an embodiment of the invention.
Figure 2:
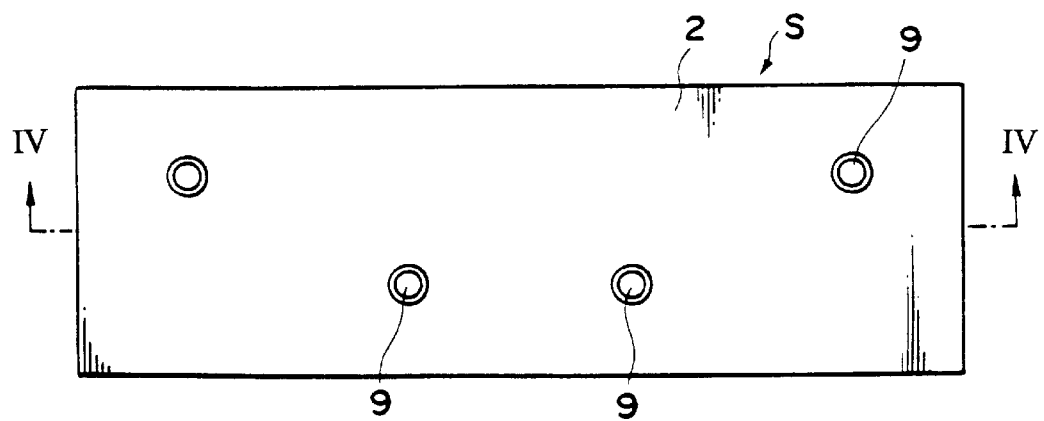
FIG. 2 is a plan view showing the inner peripheral surface of the segment of FIG. 1.
Figure 3:
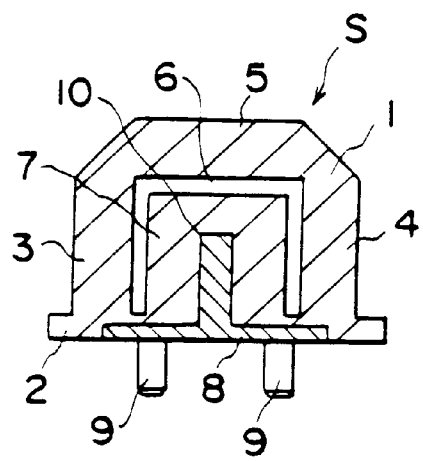
FIG. 3 is a sectional view taken in line A—A of FIG. 1.
Figure 4:
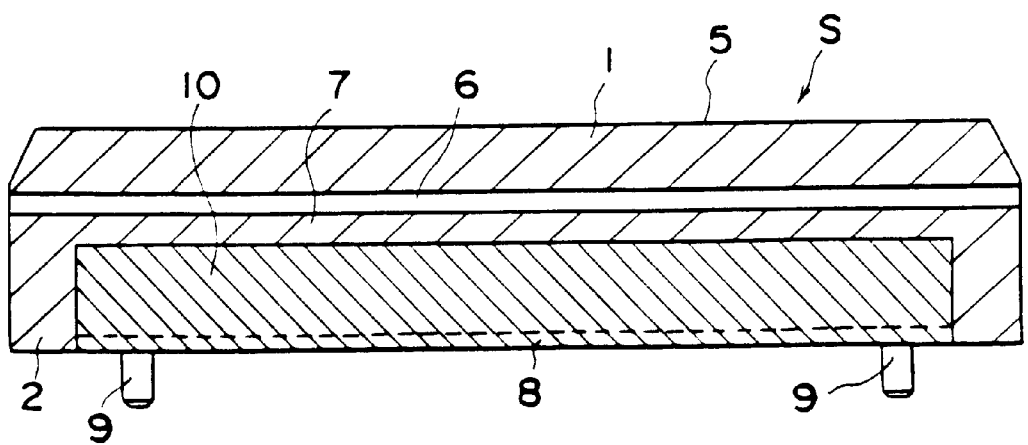
FIG. 4 is a sectional view taken in line B—B of FIG. 2.

FIG. 1 is a plan view showing the outer peripheral section of a segment according to the invention, FIG. 2 is a plan view showing the inner peripheral section thereof, FIG. 3 is a sectional view taken in line A—A, and FIG. 4 is a sectional view taken in line B—B.

In these drawings, reference numeral 1 designates a rubber elastic member making up a segment S, numeral 2 a bottom section fixed to the wheel, numerals 3, 4 side sections, and numeral 5 an outer surface section. A hollow section 6 is defined by these sections. A stopper 7 rising from the bottom section 2 is formed in the hollow section 6.

The hollow section 6 is formed through the segment S. Similarly, the stopper 7 is disposed substantially over the whole length of the hollow section 6. The hollow section 6, as described later, is disposed at right angles to the peripheral direction of the wheel, i.e., along the width of the wheel. A plate 8 is embedded in the bottom section 2. Bolts 9 for fixing the bottom section 2 to the wheel are protruded from the plate 8. Normally, a supporter 10 is welded to the plate 8 and is embedded in the stopper 7 to reinforce the stopper 7.

The stopper 7 is preferably out of contact with the inner surfaces of the side sections 3, 4 and the outer surface section (ground-contacting section) 5 making up the hollow section 6 under a static load. Under a larger load, however, these inner surfaces come into contact with the stopper 7 and the spring constant is rapidly increased. In this way, although the shock-absorbing ability is high under normal conditions, the stopper 7 and the inner surface of the hollow section 7 collide with each other under a load, thereby preventing the segment S from being abnormally displaced.

It is, therefore, necessary to maintain a sufficient strength of the stopper 7 in contact with the inner surface of the hollow section 6. For this purpose, the supporter 10 is preferably embedded in the stopper 7 as described above. In the illustrated case, the plate 8 is welded to the supporter 10 by which the strength of the stopper 7 is secured. The shape of the supporter 10 is not specifically limited. Normally, however, it is erected from the plate 8 in the form of a band as described above. In some cases, the supporter 8 may be a solid member or a hollow member having a similar contour to the stopper 7 or two strips protruded along the sides of the stopper 7.

The plate 8, though not shown, is preferably curved toward the wheel in advance in order to improve the mountability thereof on the wheel to which it is fixed.

Figure 5:
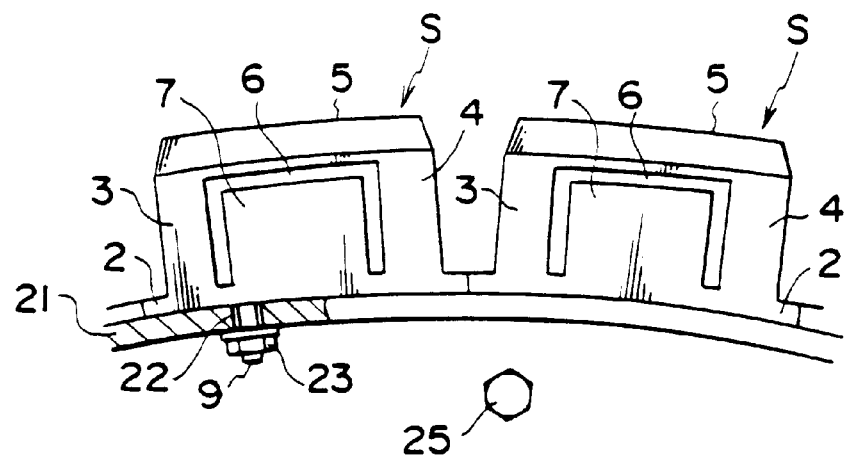
FIG. 5 is a side view showing an example in which the segments of FIGS. 1–4 are mounted on a wheel.
Figure 6:
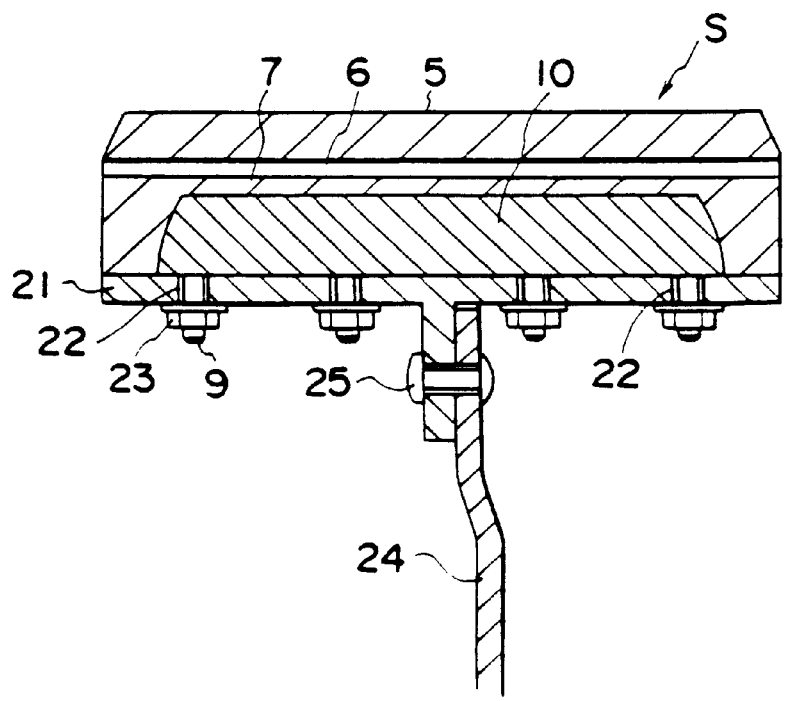
FIG. 6 is a sectional view of the essential parts in FIG. 5.

FIG. 5 is a sectional view showing an example of segments of FIGS. 1–4 S mounted on the vehicle wheel 21, and FIG. 6 is a sectional view of the essential parts thereof.

In FIGS. 5 and 6, bolts 9 protruded from the segments S are inserted in bolt holes 22 formed in the wheel 21, and are screwed with nuts 23. Numeral 24 designates a hub fixed on the wheel 21 by an arbitrary means such as welding or bolting. In the shown case, it is fixed by the bolts 25.

Normally, the segments S are fixed on the wheel 21 in such a manner that only the sides of adjacent bottom sections 2 are in contact with each other. Under a normal static load, therefore, the sides sections 3, 4 other than the bottom sections 2 of the adjacent segments S, S are out of contact with each other. This structure has the advantage that the side surfaces are not rubbed by each other and therefore rubber is not melted nor generate a smoke when the vehicle is running at high speed.

Figure 7:
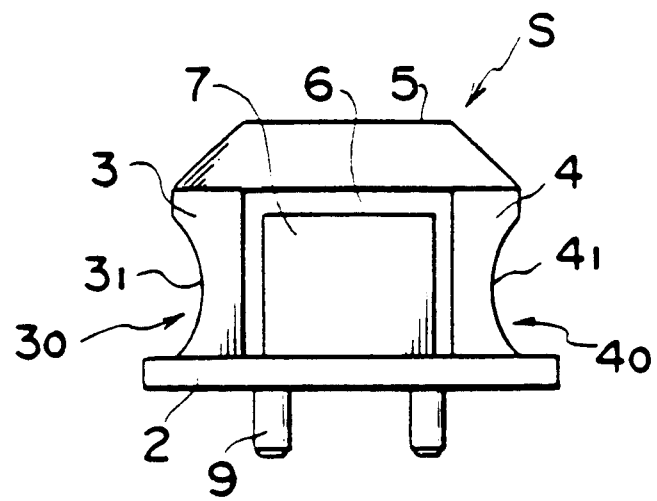
FIG. 7 is a first modification of the segment S according to the invention.
Figure 8:
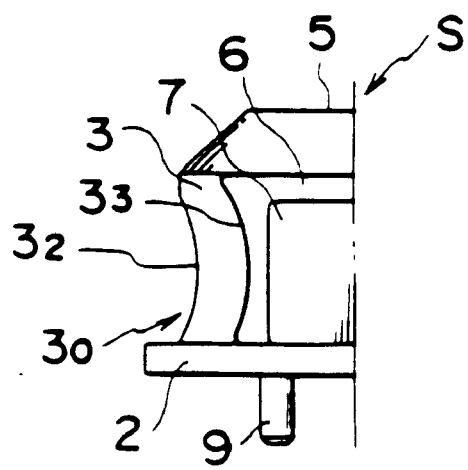
FIG. 8 is a second modification of the segment S according to the invention.
Figure 9:
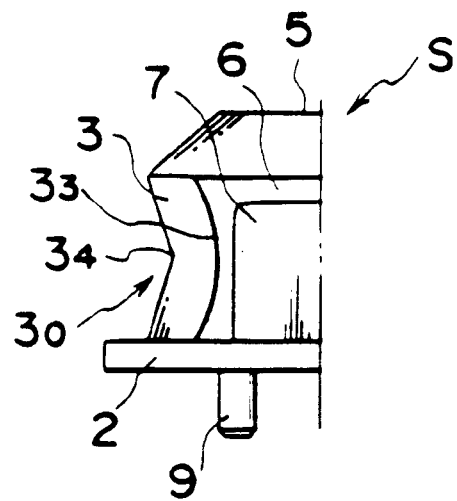
FIG. 9 is a third modification of the segment S according to the invention.
Figure 10:
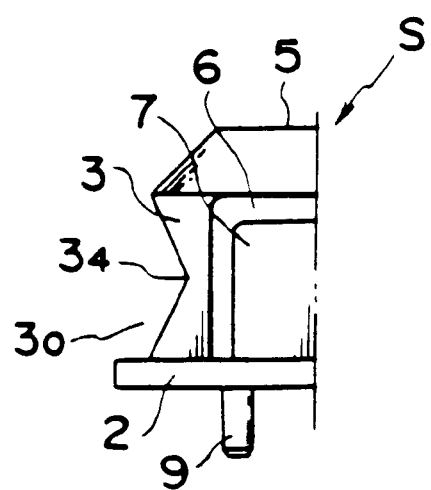
FIG. 10 is a fourth modification of the segment S according to the invention.

FIG. 7 is a diagram showing a modification of the segment S according to the invention. Curved surfaces may be formed in the side sections 3, 4. In this example, sections $3_0$, $4_0$ curved toward the hollow section, i.e., recesses $3_1$, $4_1$ are formed in the side sections 3, 4. As a result of forming the recesses $3_1$, $4_1$, the side sections 3, 4 are displaced inward so that the inner surfaces of the side sections 3, 4 are liable to come into contact with the stopper 7 under a load. Alternatively, as shown in FIG. 8, the inner surfaces and/or outer surfaces of the side sections 3, 4 may be formed with arcuate sections $3_2$, $3_3$ curved toward the stopper 7. As another alternative, as shown in FIGS. 9 and 10, a V-shaped section $3_4$ may of course be formed.

The segment S according to the invention finds various applications other than the wheels constituting a component part of the vehicle. It may be mounted, for example, on the endless rubber track suspended between a sprocket and an idler incorporated in a vehicle.

Figure 11:
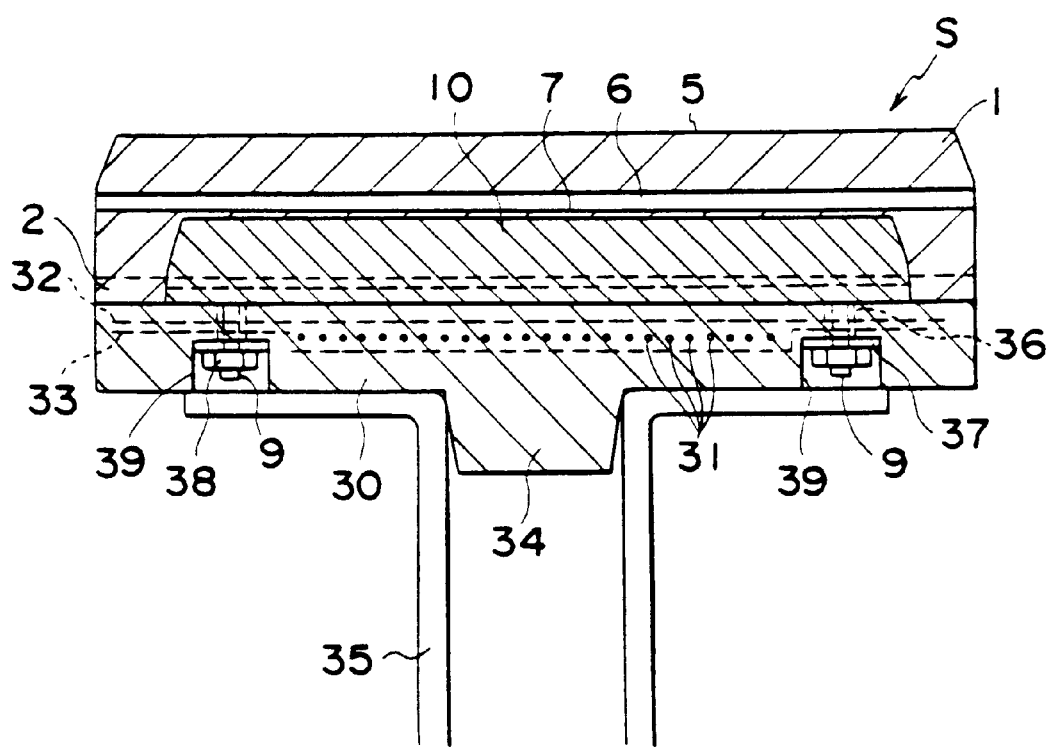
FIG. 11 is a sectional view showing an example in which the segment is mounted on an elastic endless rubber track.

FIG. 11 is a sectional view showing an example. In FIG. 11, numeral 30 designates an endless rubber track composed of a rubber elastic material, and numeral 31 steel cords embedded in the longitudinal direction of the rubber elastic material. The steel cords are held between inner and outer canvasses 32, 33 embedded to prevent the disturbance of the steel cords 31 at the time of rubber vulcanization while at the same time securing the strength of other than the portion embedded with the steel cords 31. Numeral 34 designates a protrusion formed along the inner peripheral surface of the rubber elastic member 30 for transmitting the driving force. The driving force is transmitted to a sprocket not shown in mesh with the protrusion 34, so that an idler 35 is rotated while being supported in contact with the inner peripheral surface of the rubber elastic member 30.

The bolts 9 of the segment S are fixed at the portion of the rubber elastic member 30 not embedded with the steel cords 31, i.e., the portion embedded with the canvasses 32, 33. This particular portion of the rubber elastic member 30 is formed with bolt holes 36, where the bolts 9 are fixed by washers 37 and nuts 38. The nuts 38 are required not to protrude from the surface of the portion of the rubber elastic member 30 formed with the bolt holes 36. For this purpose, recesses 39 are desirably formed in advance in the inner periphery of the endless rubber track.

Figure 12:
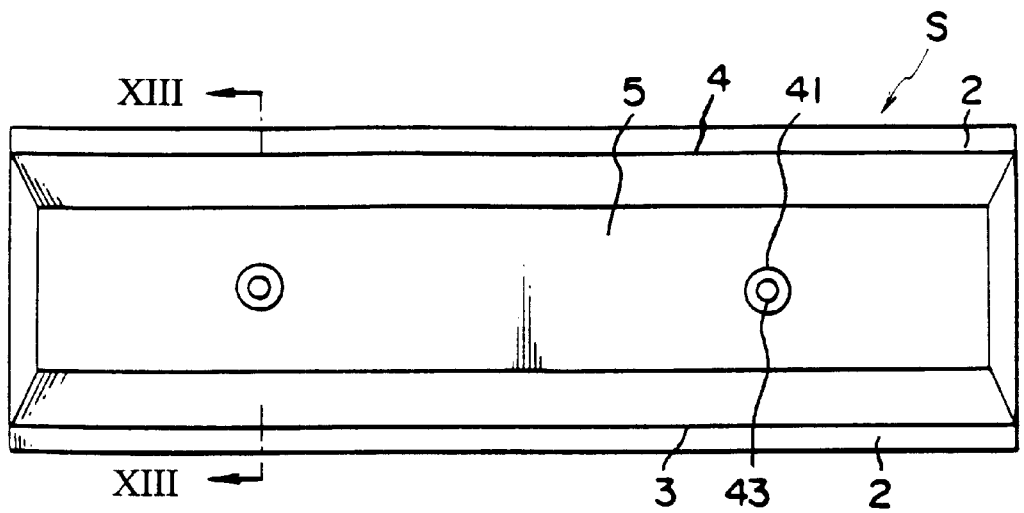
FIG. 12 is a plan view showing the outer peripheral surface of another example of the segment S.
Figure 13:
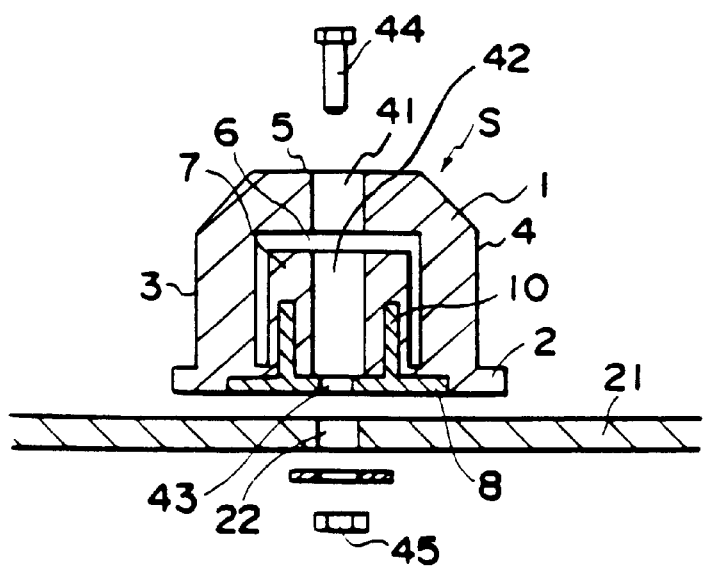
FIG. 13 is a sectional view taken in line C—C in FIG. 12.

FIG. 12 is a plan view showing the outer peripheral surface of another example of the segment S, and FIG. 13 is a sectional view taken in line C—C of FIG. 12.

In FIGS. 12 and 13, bolt holes 41 are formed in the outer surface section 5, and bolt holes 42 are formed also in the stopper 7 in opposed relation to the bolt holes 41. The plate 8 embedded in this portion is also formed with bolt holes 43. A bolt 44 is inserted into each of these bolt holes and, through a bolt hole 22 of the wheel, is screwed with a nut 45.

Although the segment S assuming a linear shape along the width of the wheel is shown above, the invention is of course not limited to such a segment shape, but a V-shaped segment S bent at the central portion thereof is also preferable. In such a case, the hollow section 6, the plate 8, the stopper 7 and the supporter 10 are also V-shaped. In this way, a substantially uniform rigidity of lugs is obtained for supporting the vehicle body, thereby reducing the driving vibrations.

Figure 14:
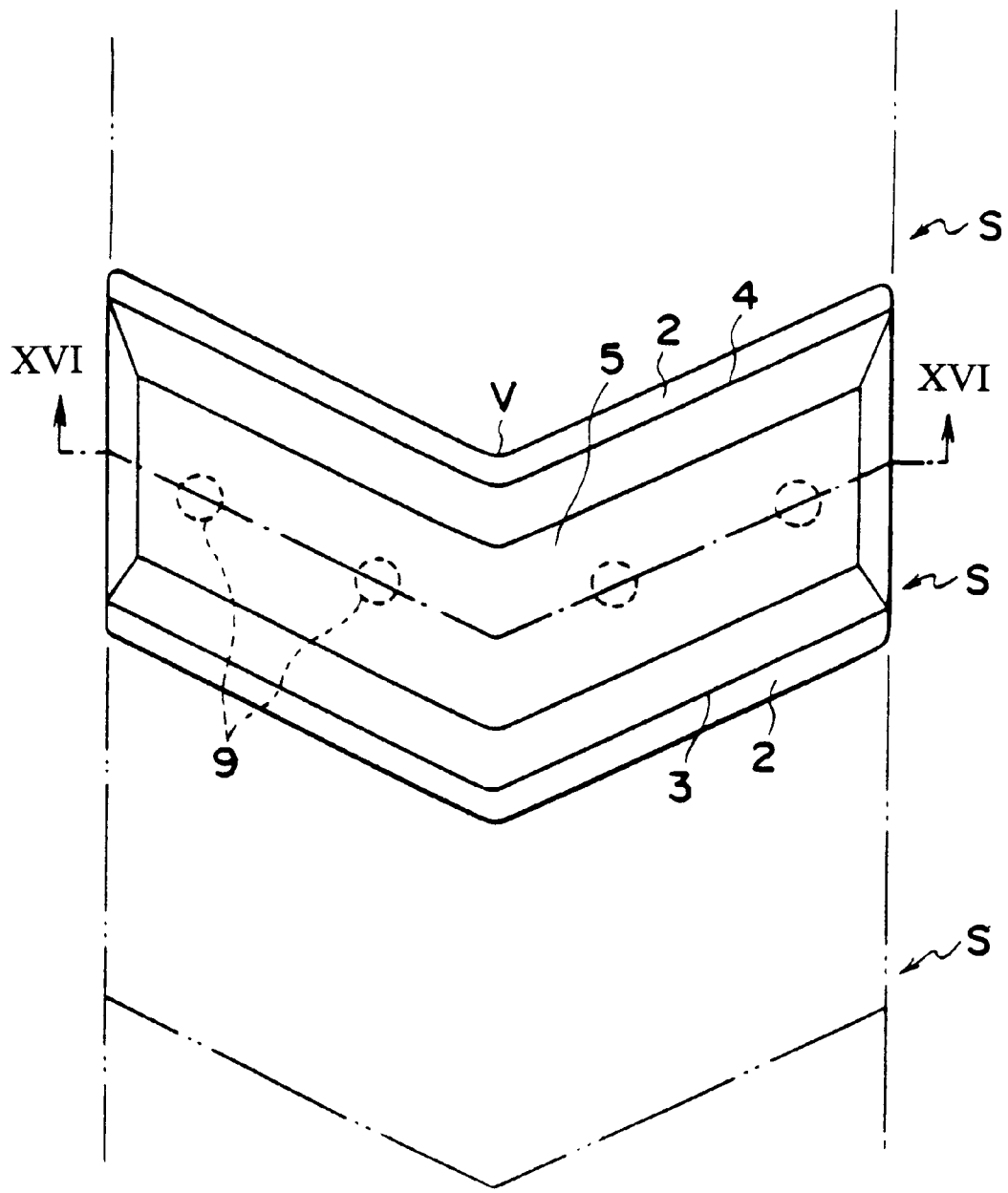
FIG. 14 is a plan view showing the outer peripheral surface of still another example of the segment S.
Figure 15:
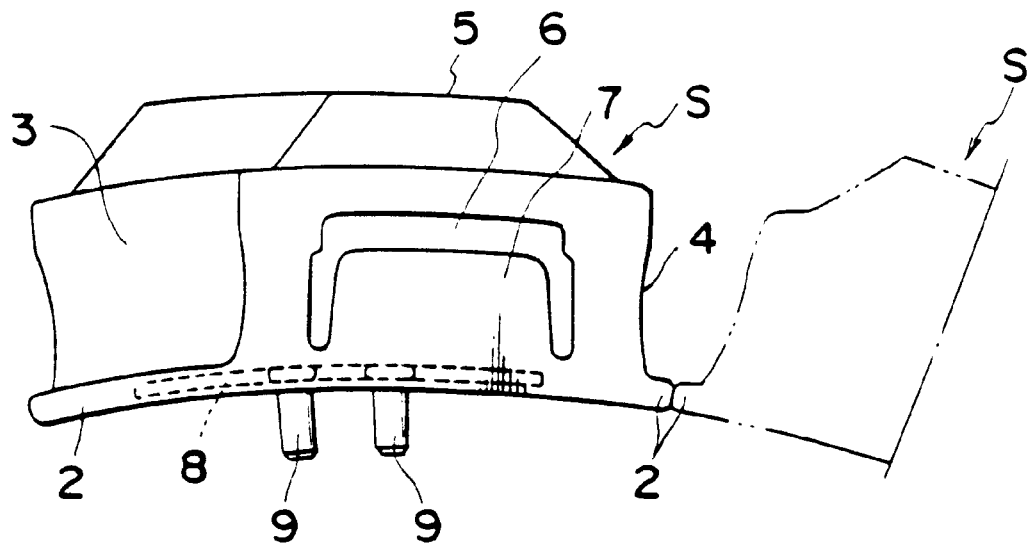
FIG. 15 is a side view showing the segment of FIG. 14.
Figure 16:
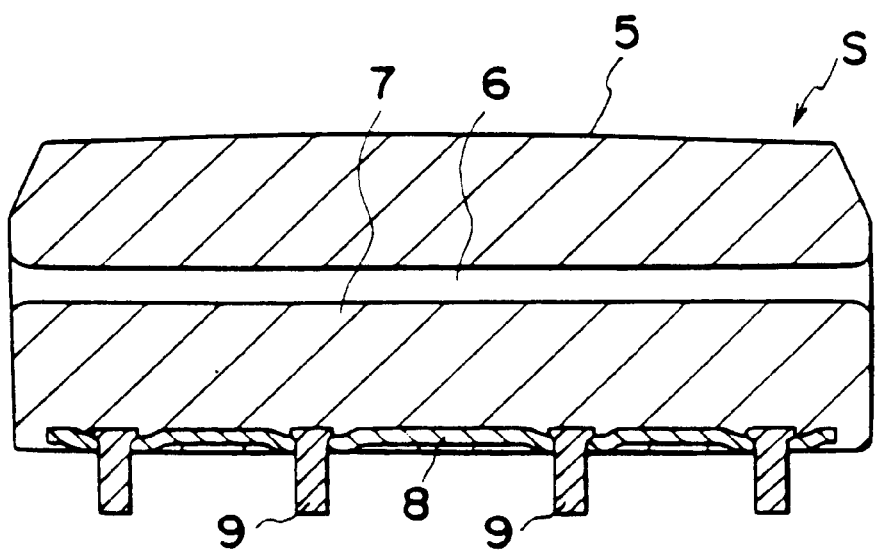
FIG. 16 is a sectional view taken in line D—D in FIG. 14.

FIG. 14 is a plan view showing the outer peripheral section of an example of a V-shaped segment S with the central portion thereof bent as described above. FIG. 15 is a side view of the same segment S, and FIG. 16 is a sectional view taken in line D—D. As seen from these drawings, adjacent segments S, when mounted on the wheel, are set in exact relative positions by means of the V-shape portions thereof, and the vehicle body is supported substantially uniformly over the entire length of the outer peripheral surface 5, i.e., the ground-contacting section of the segment S. The vibrations are thus minimized.

Figure 17:
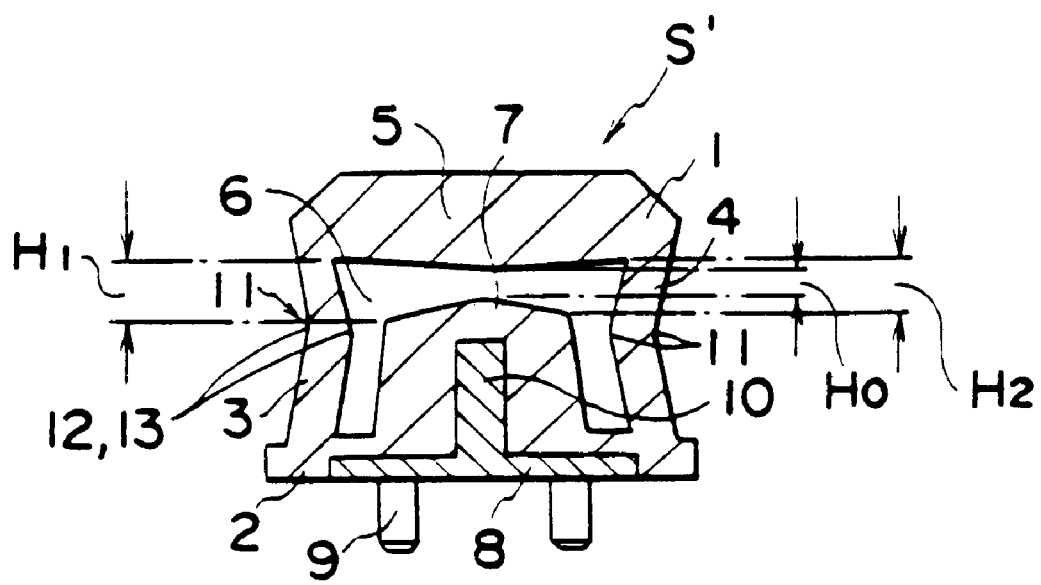
FIG. 17 is a sectional view similar to FIG. 3 showing a segment according to another embodiment of the invention.

Now, another embodiment of the invention will be explained. The same component parts as those in the above-mentioned embodiment will not be explained again. FIG. 17 is a sectional view similar to FIG. 3. The stopper 7 is out of contact with the inner surfaces of the side sections 3, 4 and the outer surface section (ground-contacting section) 5 making up the hollow section 7 under a static load. Under a larger load, however, these inner surfaces come into contact with the top surface of the stopper 7 for an increased spring constant. As a result, although the shock-absorbing ability is high under normal conditions, the top surface of the stopper 7 collides with the inner surface of the hollow section 6 so that the segment S' is effectively prevented from being abnormally displaced when a load is imposed on them.

In the shown case, the top surface of the stopper 7 and the inner surface of the hollow section 6 are both formed in angles (or in mountain-shapes) in opposed relation to each other, and the side sections 3, 4 have V-shaped inner and outer surfaces 12, 13 bent at points 11 toward the stopper 7.

According to this embodiment, the distance between the top surface of the stopper 7 and the inner surface of the outer surface section 5 (ground-contacting section), in particular, of the hollow section 6 is divided into front and rear distances ($H_1$, $H_2$) and the central distance ($H_0$) so that the relation is held $H_1$, $H_2 > H_0$. The example shows the case in which the central portion of the inner surface of the outer surface section 5 is slightly angled.

In view of the fact that the relation between the top surface of the stopper 7 and the inner surface of the outer surface section 5, in particular, of the hollow section 6 is set to have a specified shape, the ends of these portions come into contact later than the central portions thereof. The deflection-load curve, therefore, rises not at a sharp angle but along a gentle slope at the time of contacting with each other. Thus the rough feeling is eliminated.

Figure 18:
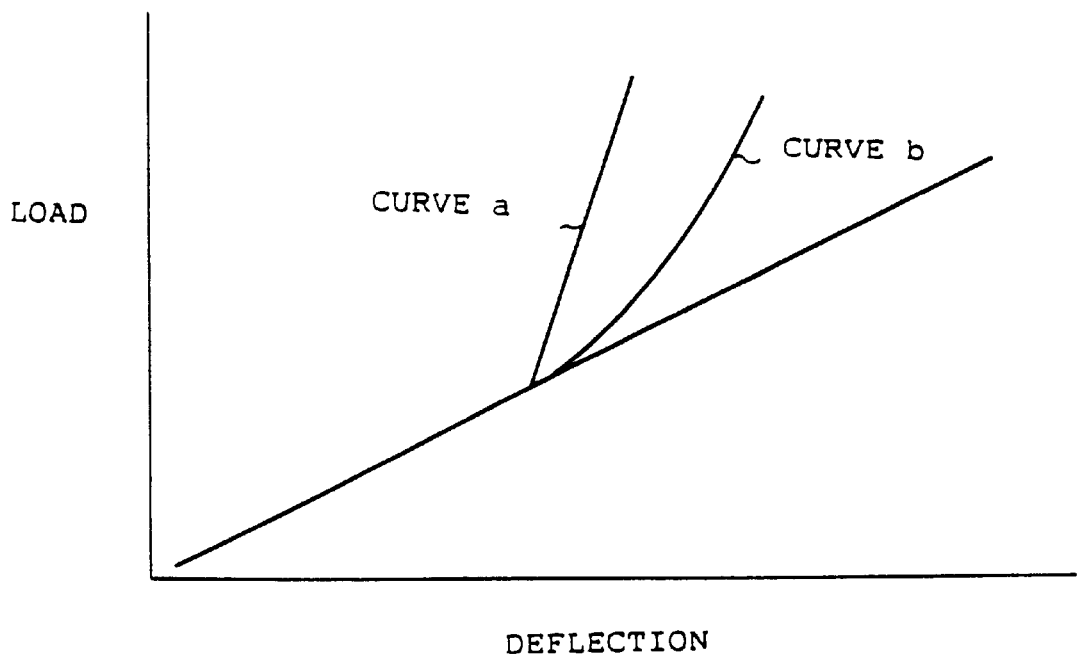
FIG. 18 is a graph showing a deflection-load curve.

FIG. 18 is a graph showing an example of the deflection-load curves. Curve a represents the case in which the top surface of the stopper 7 is flat. In the case where the top surface of the stopper 7 comes into contact with the inner surface of the outer surface section 5 in the hollow section 6 over the entire surfaces thereof, the curve a may rise sharply. Curve b, on the other hand, indicates the case of the present invention. Since the top surface of the stopper 7 is shaped in an angle, the central portion of the stopper 7 comes into contact with the inner surface of the outer surface section 5 in the hollow section 6, followed by the other parts of the surfaces sequentially up to the ends. As a result, the curve b rises gently as shown, thereby reducing the rough feeling.

Figure 19:
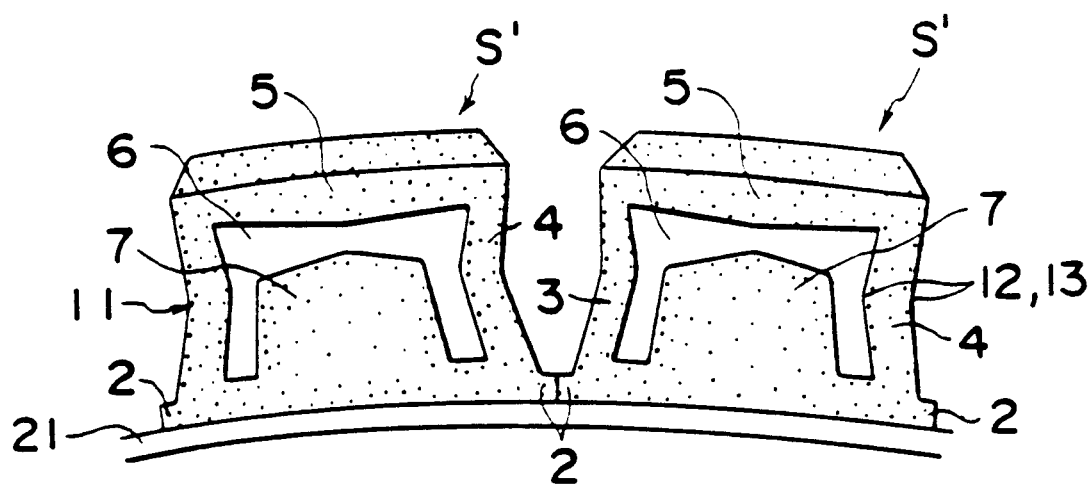
FIG. 19 is a side view showing an example in which the segments are mounted on a wheel.

FIG. 19 is a side view similar to FIG. 5 showing an example of segments S' mounted on the wheel 21. The segments S' are mounted on the wheel 21 in the same manner as in FIG. 6.

The side sections 3, 4 making up the hollow section according to this embodiment have inner and outer surfaces thereof formed with a portion 11 curved toward the stopper 7 and form V-shaped portions 12, 13. Since the side sections 3, 4 have a curved portion 11 in this way, the side sections 3, 4 are displaced inward and therefore the inner surfaces of the side sections 3, 4 are liable to come into contact with the stopper 7 under a load.

Figure 20:
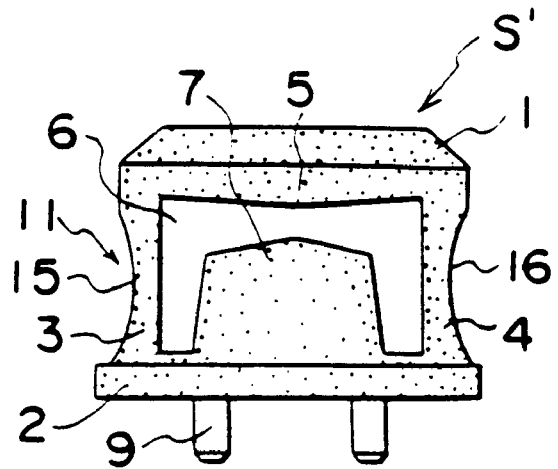
FIG. 20 is a sectional view of a fifth modification of the segment according to the invention.
Figure 21:
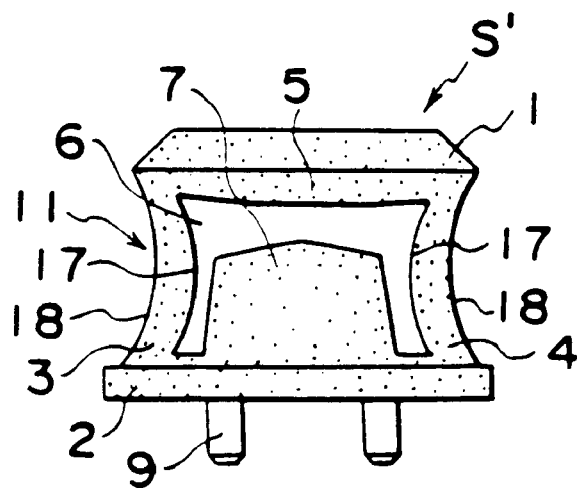
FIG. 21 is a sectional view of a sixth modification of the segment according to the invention.
Figure 22:
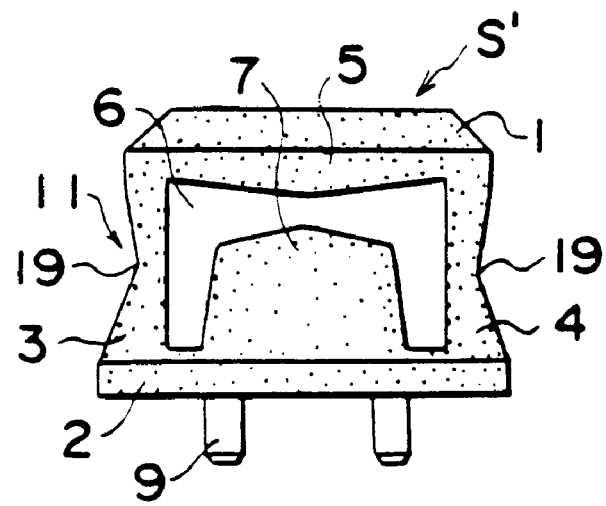
FIG. 22 is a sectional view of a seventh modification of the segment according to the invention.
Figure 23:
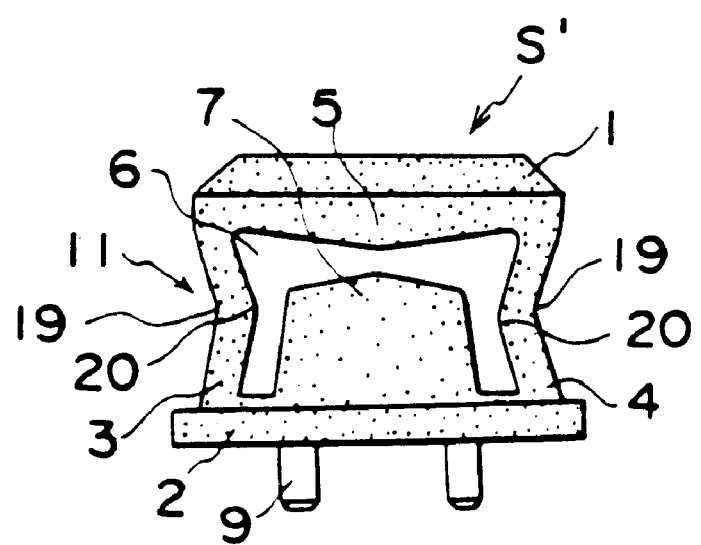
FIG. 23 is a sectional view of an eighth modification of the segment according to the invention.
Figure 24:
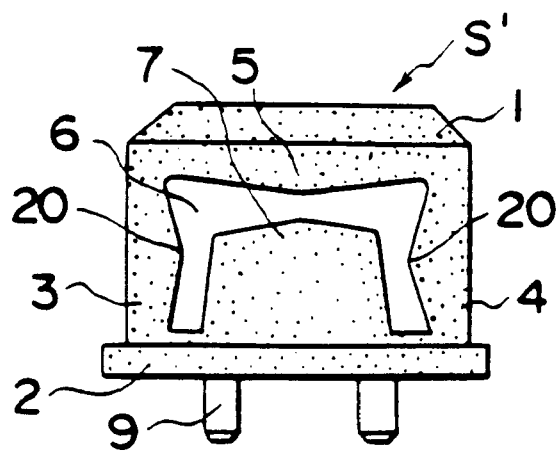
FIG. 24 is a sectional view of a ninth modification of the segment according to the invention.

FIGS. 20 to 24 show modifications of the side sections 3, 4 of the segment S' according to this embodiment. The side sections 3, 4 may be formed with the curved portion 11. In the example of FIG. 20, curved portions 11, i.e., recesses 15, 16 in the shown example are formed toward the inner surface of the hollow section on the side sections 3, 4. As shown in FIG. 21, the inner surfaces and/or the outer surfaces of the side sections 3, 4 may have portions 17, 18 arcuately curved toward the stopper to form curved portions 11. Further, as shown in FIGS. 22 and 23, V-shaped portions 19 may be formed as the curved portions 11. In FIG. 24, V-shaped protrusions 20 are formed on the inner surface of the side sections 3, 4 with equal effect.

Figure 25:
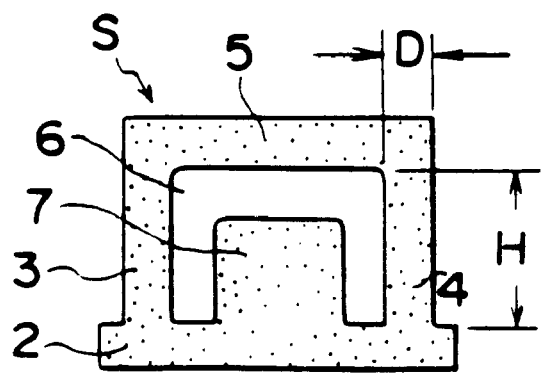
FIG. 25 is a sectional view of a tenth modification of the segment according to the invention.

When the stopper 7 comes into contact with the interior wall of the hollow section, the side sections preferably have any of the above-mentioned shapes. In some cases, however, a similar effect is obtained by specifying the relation between the height H of the hollow section and the thickness D of the side sections. This effect is obtained by holding the relation $H \geq 3D$ as shown in FIG. 25.

According to this embodiment, like in the embodiments previously described, the segment S' is not limited to a shape linear along the width of the wheel, but preferably is V-shaped with a bent central portion in a plan view.

Figure 26:
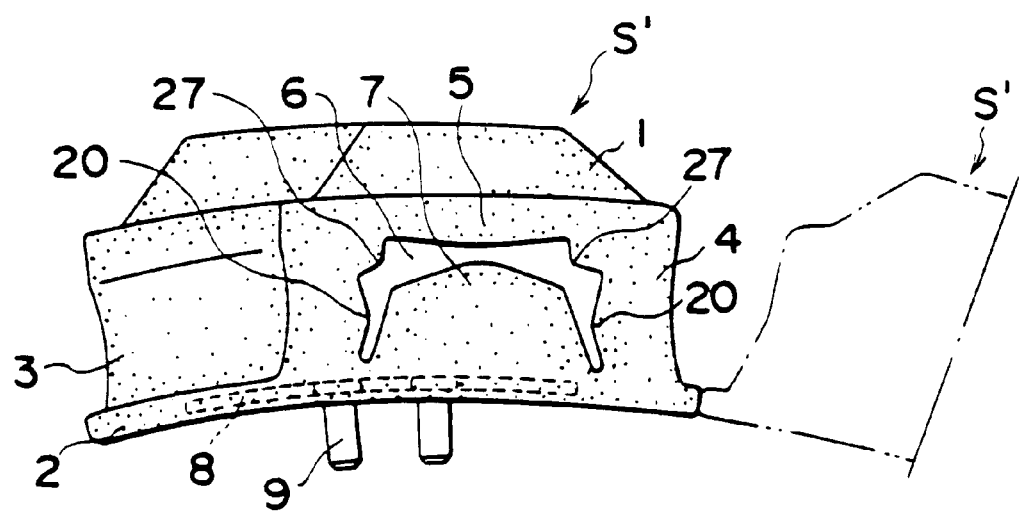
FIG. 26 is a plan view showing the inner peripheral surface of a segment according to a further embodiment of the invention.

FIG. 26 is a sectional view similar to FIG. 15 showing an example of the segment S' having a V-shaped bent central portion. The primary feature of this segment S' is that contact protrusions 27 adapted to come in contact with the surface of the stopper 7 are formed on the inner surface of the hollow section. The contact protrusions 27 are formed at the corners of the inner surface of the hollow section in the case under consideration. The contact protrusions 27 first contact the top surface of the stopper 7, then slide on the same surface and finally slide down the side surfaces of the stopper 7. The rubbing process between the two components parts due to this slide generates a loss in the rubber elastic material and hence an attenuation effect.

Figure 27:
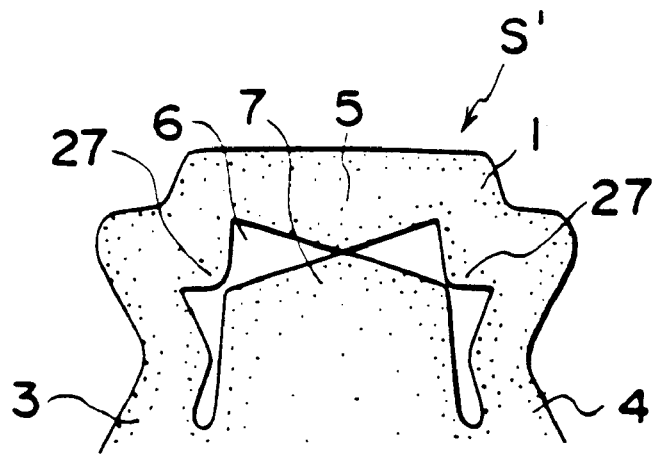
FIG. 27 is a diagram showing the manner in which the angle of the top surface of the stopper and the angle of the outer surface of a segment are partly in contact with each other.
Figure 28:
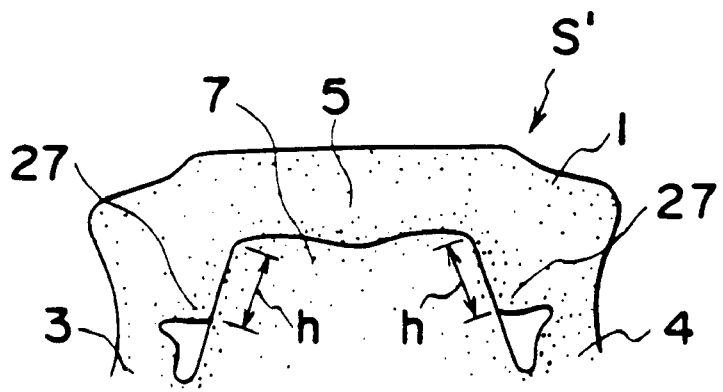
FIG. 28 is a diagram showing the manner in which the angle of the top surface of the stopper and the angle of the outer surface of a segment are fully in contact with each other.

The effect of forming the contact protrusions 27 of the segment S of the rubber elastic material according to this embodiment will be described with reference to the drawings. FIGS. 27 and 28 are partially enlarged views for explaining the manner in which the contact protrusions 27 of the segment S' of the rubber elastic material are in contact with the stopper 7.

The rubber elastic segment S' is made up of the stopper 7, the side sections 3, 4 and the outer surface section 5 with the hollow section 6 inbetween. The top surface of the stopper 7 is angled to have the highest central portion, and the inner side of the outer surface section 5 is formed also with an angle. Further, the ends of the outer surface section 5 are formed with the contact protrusions 27.

FIG. 27 shows the manner in which the angle of the top surface of the stopper 7 is in contact with the angles of the outer surface section 5. The distance h is maintained between the end of the stopper 7 and the inner side surfaces of the outer surface section 5. This indicates that the outer surface section 5 still have an allowance to be displaced by h toward the stopper 7. It follows, however, that the contact protrusions 27 are rubbed against the side surfaces of the stopper 7 by the distance of displacement. FIG. 28 shows the manner in which the stopper 7 and the inner side surfaces of the outer surface section 5 are in full contact with each other. The contact protrusions 27 come into surface contact with and rub against the sides of the stopper 7.

Consequently, the rubbing process between these two component members causes a loss in the rubber elastic material, thereby absorbing vibrations effectively.

Figure 29:
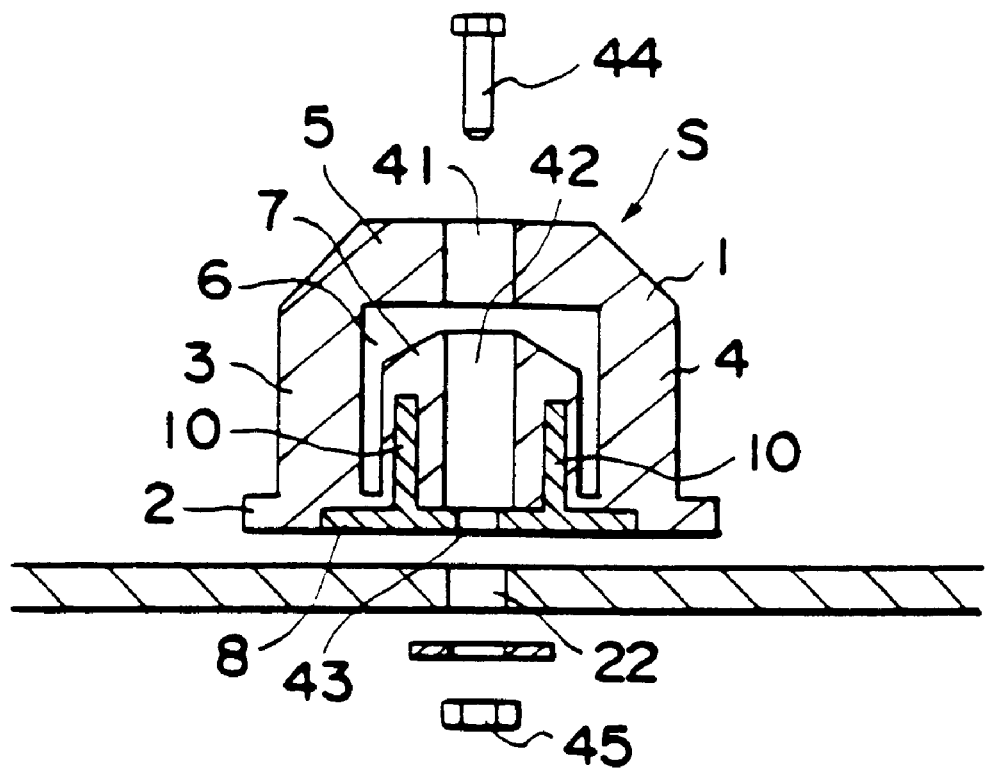
FIG. 29 is a sectional view showing a still further example of the segment.

FIG. 29 is a sectional view showing another example of the segment S' similar to FIG. 13. In the embodiment shown in FIG. 29, the stopper 7 is formed in an angle with the side portions thereof inclined along the peripheral direction of the wheel or the endless rubber track.

The segment S' according to this embodiment, like the segment S of the above-mentioned embodiments, find various applications other than those mounted on the wheels of the vehicle. It may be used, for example, by being mounted on the endless rubber track suspended between a sprocket and an idler of a vehicle body in the same manner as shown in FIG. 11.

Figure 30:
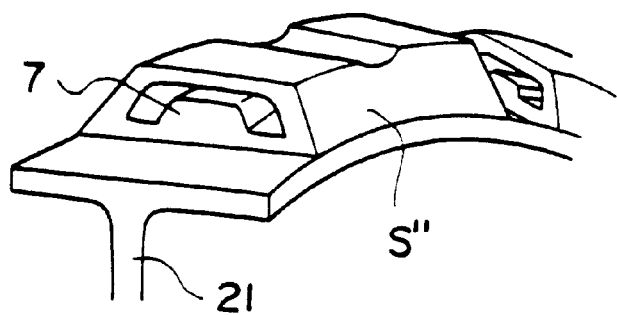
FIG. 30 is a perspective view showing an example of a segment in which the hollow section is formed to extend along the periphery of the wheel.
Figure 31:
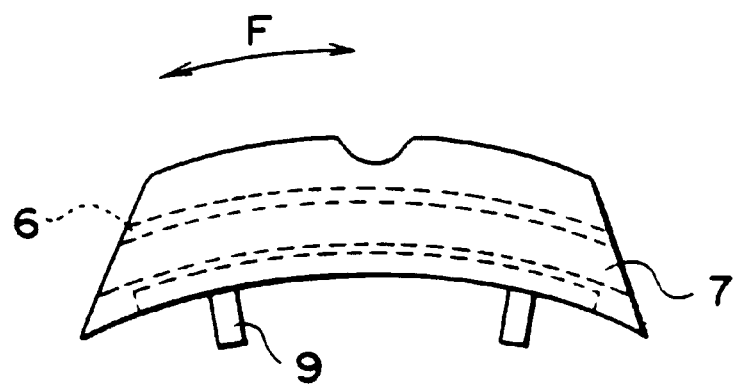
FIG. 31 is a side view showing the segment of FIG. 30.

In the above-mentioned embodiments, segments were explained in which a hollow section is formed to extend along the width of a wheel or an endless rubber track. As shown in FIG. 30, a segment can be formed in such a manner that the hollow section extends along the peripheral direction of the wheel or the endless rubber track. FIG. 30 shows the manner in which a segment S'' with the hollow section 6 and the stopper 7 extending along the peripheral direction of the wheel 21 is mounted on the wheel 21. FIG. 31 is a diagram showing the segment S'' as viewed along the width of the wheel. The arrow F represents the peripheral direction of the wheel. At least a lug not shown is formed on the outer surface of the segment S'' radially outward of the wheel. Mounting bolts 9 are protruded from the surface of the segment S'' radially inward of the wheel for mounting the segment S'' on the wheel 21.

In the case of a segment with the hollow section formed along the peripheral direction of the wheel or the endless rubber track, the segment is deformed along the width and therefore adjacent segments can be prevented from contacting each other. Therefore, there is posed no problem of heat generation or the like.

Figure 32:
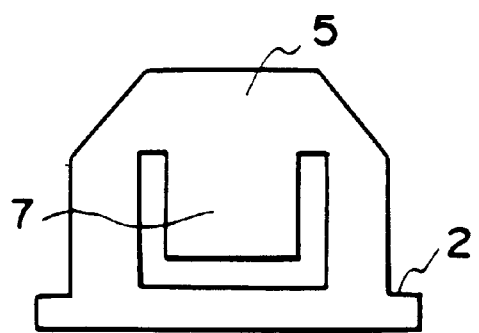
FIG. 32 is a diagram showing an example of a segment in which the stopper is protruded from the outer surface into the hollow section of the segment.

Further, although the aforementioned embodiments refer to the case in which the stopper is protruded from the bottom section of the segment into the hollow section, the stopper may alternatively be protruded from the outer surface section into the hollow section as shown in FIG. 32 to produce the same effect as the aforementioned embodiments.

It will thus be understood from the foregoing description that according to the present invention, there is provided a segment capable of being easily mounted on a vehicle wheel or an endless rubber track while maintaining a superior riding comfort. Should any one of the segments be broken, the original function can be maintained by replacing the broken segment alone. The service life of the whole segments, therefore, is greatly lengthened.

While the embodiments of the present invention as herein disclosed constitute a preferred form, it is to be understood that other forms might be adopted.

What is claimed is:

1. A plurality of segments of a rubber elastic material to be mounted on the outer periphery of a vehicle wheel or an endless rubber track of a vehicle having a vehicle body, each segment comprising:

a bottom section mounted in contact with the wheel or the endless rubber track;

side sections;

an outer surface section formed on the ground-contacting side of the segment;

a hollow section having an inner surface extending in a direction along the width of said vehicle wheel or said endless rubber track, the hollow section being defined by said bottom section, said side sections and said outer surface section and formed through said elastic segment; and a stopper formed in said hollow section extending in the direction of said hollow section with a material used in forming said bottom section, said stopper being kept out of contact with the inner surface of said hollow section under a static load of the vehicle body and in contact with the inner surface under a non-static load, and the side sections of the segments being kept out of contact with each other under the static load.

2. A segment mounted on a wheel or an endless rubber track according to claim 1, further comprising a supporter embedded in said stopper for preventing the displacement of said stopper.

3. A segment mounted on a wheel or an endless rubber track according to claim 1, wherein each of said side sections has a surface at least a portion of which is curved toward said stopper.

4. A segment mounted on a wheel or an endless rubber track according to claim 1, wherein said stopper is formed as a protrusion into said hollow section from said bottom section.

5. A segment mounted on a wheel or an endless rubber track according to claim 1, wherein said stopper is formed as a protrusion into said hollow section from said outer surface section.

6. A segment mounted on a wheel or an endless rubber track according to claim 1, wherein said bottom section is formed to protrude from said side sections outward along the direction in which the vehicle is driven, whereby the side sections of said adjacent segments of rubber elastic material are out of contact with each other.

7. A segment mounted on a wheel or in endless rubber track according to claim 1, said stopper having a top surface wherein the distance between the top surface of said stopper and the inner surface of said hollow section is larger at the front and rear ends thereof along the direction in which the vehicle is driven and smaller at the central portion thereof.

8. A segment mounted on a wheel or an endless rubber track according to claim 7, wherein the outer wall surface and/or the inner wall surface of each of the side sections of said segment of rubber elastic material has a surface portion curved toward said stopper.

9. A segment mounted on a wheel or an endless rubber track according to claim 7, further comprising at least one protrusion formed on the inner wall of said hollow section adapted to be in surface contact with said stopper when said segment of rubber elastic material is bent.

10. A segment mounted on a wheel or an endless rubber track according to claim 1, wherein said hollow section is formed to extend along the peripheral direction of said wheel or said endless rubber track.

11. A segment mounted on a wheel or an endless rubber track according to claim 1, wherein said material of said stopper is rubber elastic.

12. A plurality of segments of a rubber elastic material mounted on the outer periphery of a wheel or an endless rubber track of a vehicle having a vehicle body, each segment comprising:

a bottom section mounted in contact with said wheel or said endless rubber track;

side sections;

an outer surface section formed on the ground-contacting side of said segment;

a hollow section having an inner surface defined by said bottom section, said side sections and said outer surface section and formed through said elastic segment along a width of said wheel or endless rubber track; and a stopper protruded from said bottom section into said hollow section, to extend along the width of said wheel or said endless rubber track, said stopper being formed with a material used in forming said bottom section, and being kept out of contact with an inner surface of said hollow section under a static load, said stopper being kept out of contact with the inner surface of said hollow section under a static load of the vehicle body and in contact with the inner surface under a non-static load, and the side sections of the segments being kept out of contact with each other under the static load.

13. A segment mounted on a wheel or an endless rubber track according to claim 12, further comprising a supporter embedded in said stopper for preventing the displacement.

14. A segment mounted on a wheel or an endless rubber track according to claim 12, wherein each said side sections has a surface portion curved toward said stopper.

15. A segment mounted on a wheel or an endless rubber track according to claim 12, wherein said bottom section is protruded from said side sections outward along the direction in which the vehicle is driven, so that the side sections of adjacent segments of rubber elastic material mounted on the wheel or the endless rubber track are kept out of contact with each other.

16. A segment mounted on a wheel or an endless rubber track according to claim 12, wherein said material of said stopper is rubber elastic.

17. A segment mounted on a wheel or an endless rubber track according to claim 12, further comprising a supporter embedded in said stopper for preventing the displacement of said stopper.

* * * * *